United States Patent
Schroeder

(10) Patent No.: US 6,876,788 B2
(45) Date of Patent: Apr. 5, 2005

(54) PREVENTING HYDRODYNAMIC CROSSTALK IN AN OPTICAL SWITCH

(75) Inventor: Dale W. Schroeder, Scotts Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 393 days.

(21) Appl. No.: 10/241,338

(22) Filed: Sep. 11, 2002

(65) Prior Publication Data

US 2004/0047545 A1 Mar. 11, 2004

(51) Int. Cl.[7] .............................. G02B 6/26; G02B 6/42
(52) U.S. Cl. ............................ 385/17; 385/18; 385/22
(58) Field of Search ............................. 385/13, 15, 17, 385/18, 22, 16, 24, 20

(56) References Cited

U.S. PATENT DOCUMENTS

| | | | |
|---|---|---|---|
| 5,699,462 A | * 12/1997 | Fouquet et al. | ................ 385/18 |
| 5,960,131 A | 9/1999 | Fouquet et al. | |
| 6,005,993 A | * 12/1999 | MacDonald | ................. 385/16 |
| 6,055,344 A | * 4/2000 | Fouquet et al. | ................ 385/16 |
| 6,154,586 A | * 11/2000 | MacDonald et al. | .......... 385/18 |
| 6,160,928 A | 12/2000 | Schroeder | |
| 6,188,815 B1 | 2/2001 | Schiaffino et al. | |
| 6,195,478 B1 | 2/2001 | Fouquet | |
| 6,198,856 B1 | 3/2001 | Schroeder et al. | |
| 6,320,994 B1 | 11/2001 | Donald et al. | |
| 6,320,995 B1 | 11/2001 | Schroeder | |
| 6,324,316 B1 | 11/2001 | Fouquet et al. | |
| 6,327,397 B1 | 12/2001 | Schiaffino et al. | |
| 6,678,435 B2 | * 1/2004 | Pan et al. | ..................... 385/16 |
| 2002/0076142 A1 | * 6/2002 | Song | ............................ 385/22 |
| 2002/0164109 A1 | * 11/2002 | Oikawa et al. | ............... 385/17 |
| 2004/0047545 A1 | * 3/2004 | Schroeder | .................... 385/17 |
| 2004/0067012 A1 | * 4/2004 | Schroeder et al. | ........... 385/18 |

* cited by examiner

Primary Examiner—Thien M. Le

(57) ABSTRACT

Optical switches that create bubbles in a liquid to change the state of switching sites use guard bubbles to prevent liquid that is rapidly displaced when creating a bubble in one switching site from disturbing another switching site. Liquid in the optical switch can be at a fluid pressure and temperature such that the guard bubbles, which are relatively large, are stable without local heating, and such that bubbles in the switching site can be turned on and off through activation and deactivation of heating elements for the switching sites. A power-up process for the optical switch can create the guard bubbles using either heating elements in the guard chambers or the heating elements in the switching sites.

14 Claims, 4 Drawing Sheets

PREVENTING HYDRODYNAMIC CROSSTALK IN AN OPTICAL SWITCH

BACKGROUND

Optical switches, which can directly manipulate optical signals, are becoming increasingly important for optical networking. Accordingly, several techniques for switching optical signals have been developed. FIG. 1A shows a plan view of an optical switch 100 that uses some of the optical switching techniques described in U.S. Pat. No. 5,699,462 to Fouquet et al., entitled "Total Internal Reflection Optical Switches Employing Thermal Activation." As illustrated in FIG. 1A and in the cross-sectional views of FIGS. 1B and 1C, optical switch 100 includes a planar lightwave circuit 110, a semiconductor substrate 120, a base plate 130, and a reservoir 140.

Planar lightwave circuit 110 is a plate of an optical material such as quartz containing crossing waveguide segments 112 and 114 and cavities 116 at the intersections of waveguide segments 112 with waveguide segments 114. Optical signals are generally input to optical switch 100 on one set of waveguide segments 112 or 114, and cavities 116 act as switching sites for the optical signals. In particular, a cavity 116 when filled with a liquid 142 having a refractive index matching the refractive index of the waveguides 112 and 114 transmits an optical signal from an input waveguide segment 112 or 114 into the next waveguide segment 112 or 114 along the same path. FIG. 1B shows a cavity 116A filled with liquid 142.

FIG. 1B also shows a cavity 116B that contains a bubble 146B that makes the switching site reflective. More specifically, total internal reflection at an interface 115 between an input waveguide 112 or 114 and bubble 146B reflects an optical signal and switches the optical signal into a crossing waveguide segment 114 or 112. Selectively creating a bubble in one of the cavities 116 along the initial path of an optical signal can make that cavity reflective and switch the optical signal onto the crossing waveguide segments 114 or 112 corresponding to the reflective cavity. If none of the cavities 116 along the path of an optical signal are reflective, the optical signal passes straight through optical switch 100.

Semiconductor substrate 120 contains electronic circuitry including heating elements 122 positioned in cavities 116. Selectively activating a heating element 122 vaporizes liquid in the corresponding cavity 116 and activates (i.e., makes reflective) the switching site corresponding to the cavity 116 containing the activated heating element 122. The activated heating element 122 then continues heating to keep the bubble stable and keep the switching site reflective. If the heating element 122 is turned off, bubble 146 and surrounding liquid 142 cool, causing bubble 146 to collapse and the cavity 116 to refill with liquid 142.

FIG. 1C illustrates the process of activating the switching site corresponding to cavity 116A. For activation, power is applied to a heating element 122A to raise a portion of liquid 142 to a temperature high enough to form a bubble 146A in cavity 116A. The required temperature corresponds to the nucleation energy for bubble formation and is generally well above the boiling point of liquid 142. Accordingly, bubble 146A expands rapidly even if the power supplied to heating element 122A decreases. Expanding bubble 146A pushes liquid 142 out of cavity 146A. Liquid from 116A eventually flows to a reservoir 140 via liquid layer 150, which underlies planar lightwave circuit 110, one or more holes 156 through substrate 120, and an inlet/outlet 154 through base plate 130. Additional channels 152 etched in planar lightwave circuit 110 can aid flow to holes 156.

A problem for optical switch 100 is the flow of liquid 142 from a cavity 116A being activated into neighboring cavities 116B containing established bubbles 146. The flow arises because existing bubbles 146B compress easily and are generally closer to the activating bubble 146A than is a gas cushion 144 in reservoir 140. Liquid 142 flowing into a cavity 116B containing an established bubble 146B can disrupt the reflection at that switching site and interfere with switching of an optical signal, creating crosstalk or noise in the optical signals.

In view of the need for clean and stable switching of optical signals without hydrodynamic crosstalk, structures and operating methods are sought that prevent disruption of activated switching sites during activation of other switching sites.

SUMMARY

In accordance with an aspect of the invention, an optical switch that uses bubbles in a liquid to redirect optical signals has guard bubbles near the optical switching sites. The guard bubbles cushion or absorb fluid flow created during bubble creation so that bubble creation in one switching site does disturb not nearby switching sites.

One specific embodiment of the invention is an optical switch that includes an optical structure, guard chambers, and a liquid in communication with the guard chambers and with switching cavities in the optical structure. The optical structure generally contains a set of first optical paths; a set of second optical paths that cross the first optical paths; and the switching cavities at intersections of the optical paths. Each switching cavity has a first state in which the switching cavity is filled with the liquid and a second state in which the switching cavity contains a bubble, and the state of each switching cavity determines whether an optical signal is reflected from or transmitted through the switching cavity. The guard chambers contain guard bubbles and can also be formed in the optical structure as cavities that are away from the optical paths.

With the switching cavities and the guard chambers in the optical structure, the optical structure can further include connecting necks that provide lower resistance fluid paths between the switching cavities and the guard chambers. In different configurations depending on the density and locations of switching cavities and optical paths, the connecting necks can connect one switching cavity to two or more guard chambers, and/or the connecting necks can connect one guard chamber to two or more switching cavities.

The guard bubbles in the guard chambers can be maintained by controlling the fluid pressure and the operating temperature of the liquid. In one case, the liquid has a pressure difference between the fluid pressure and the vapor pressure of the liquid such that the guard bubbles in the guard chambers are stable at the operating temperature of the liquid. The pressure difference can further be such that for each switching cavity, local heating of the bubble in the switching cavity is required to maintain the switching cavity in the second state.

Heating elements can be provided in the guard chambers to create the guard bubbles during power-up of the optical switch. Alternatively, heating elements in the switching cavities can create bubbles that expand from the switching cavities into the guard chambers to create the guard bubbles.

Another embodiment of the invention is a method for operating an optical switch. The method includes maintaining bubbles in guard chambers that are in fluid communications with a liquid and switching cavities of the optical switch. When local heating of the liquid in a selected switching cavity creates a bubble in the selected switching cavity, the liquid that is displaced by bubble creation in the selected cavity predominantly flows into one or more of the guard chambers, instead of into a nearby switching site containing a bubble.

Maintaining the bubbles in the guard chambers can be achieved by maintaining the liquid at a fluid pressure and an operating temperature such that bubbles filling the guard chambers are stable without heating the guard chambers. In contrast, the fluid pressure, the operating temperature, and the dimensions of the switching cavities can be such that the bubble in the selected switching cavity collapses when local heating stops. A change in the switching state of the optical switch can thus be performed by turning heating elements on or off for individual switching sites.

The bubbles in the guard chambers can be created by heating the liquid in the switching cavities to create bubbles that expand from the switching cavities into the guard chambers or by using heating elements that are in the guard chambers. When heating elements in the switching cavities create the bubbles in the guard chambers, stopping the heating causes portions of the bubbles in the switching cavities to collapse, while the bubbles in the guard chambers remain.

BRIEF DESCRIPTION OF THE DRAWINGS

Use of the same reference symbols in different figures indicates similar or identical items.

DETAILED DESCRIPTION

In accordance with an aspect of the invention, an optical switch that redirects optical signals using bubbles in activated switching sites has guard bubbles to absorb transient fluid flows resulting from creation of bubbles. The guard bubbles reduce fluid flows into activated switching sites and thereby reduce hydrodynamic crosstalk, noise, or signal disruption. An initialization process for the optical switch creates the guard bubbles in guard cavities near the cavities that form switching sites, and proper selection of the fluid pressure, the operating temperature, and the dimensions of the guard bubbles can maintain the guard bubbles without requiring local heating.

Figure 1A:
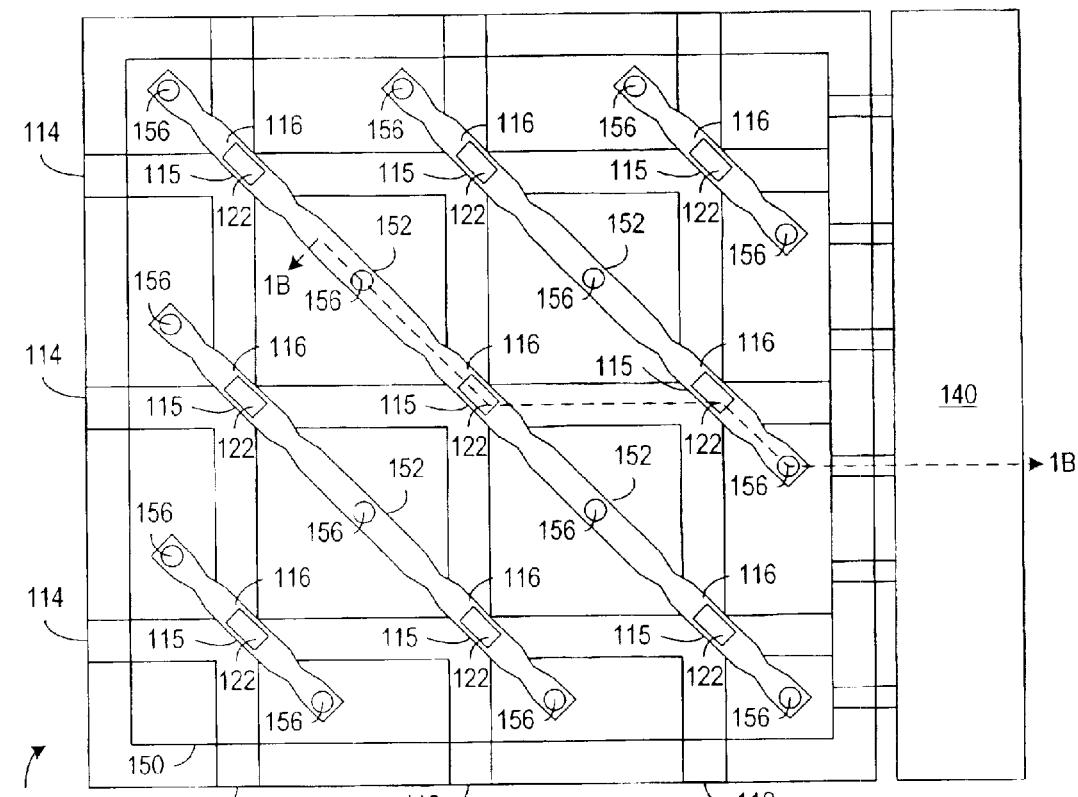
FIG. 1A shows a plan view of a known optical switch.
Figure 1B:
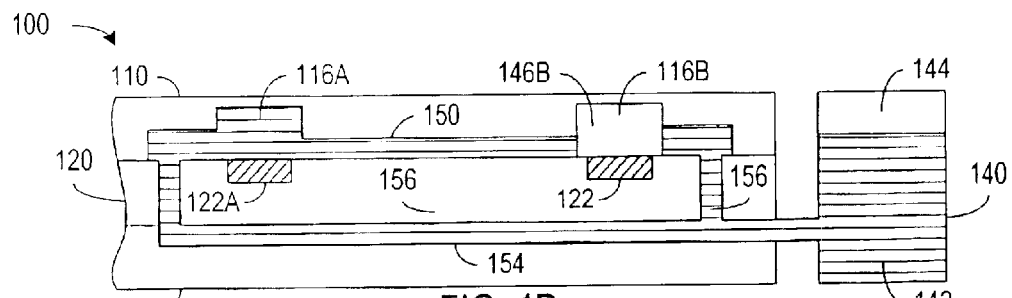
FIGS. 1B and 1C show cross-sectional views of the optical switch of FIG. 1A before and during activation of a switching site.
Figure 1C:
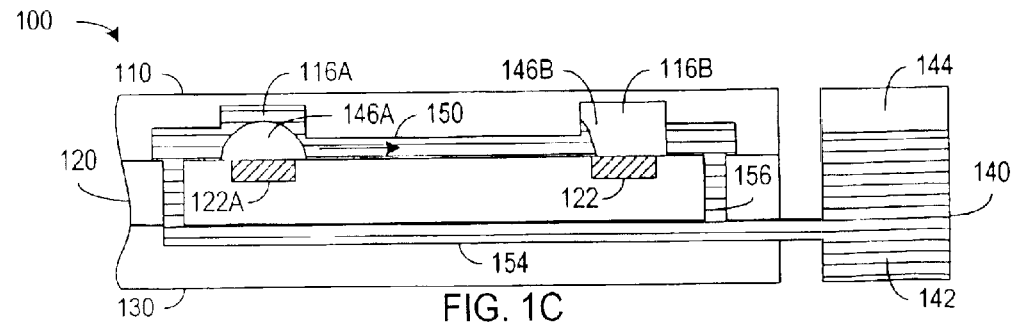
Figure 2:
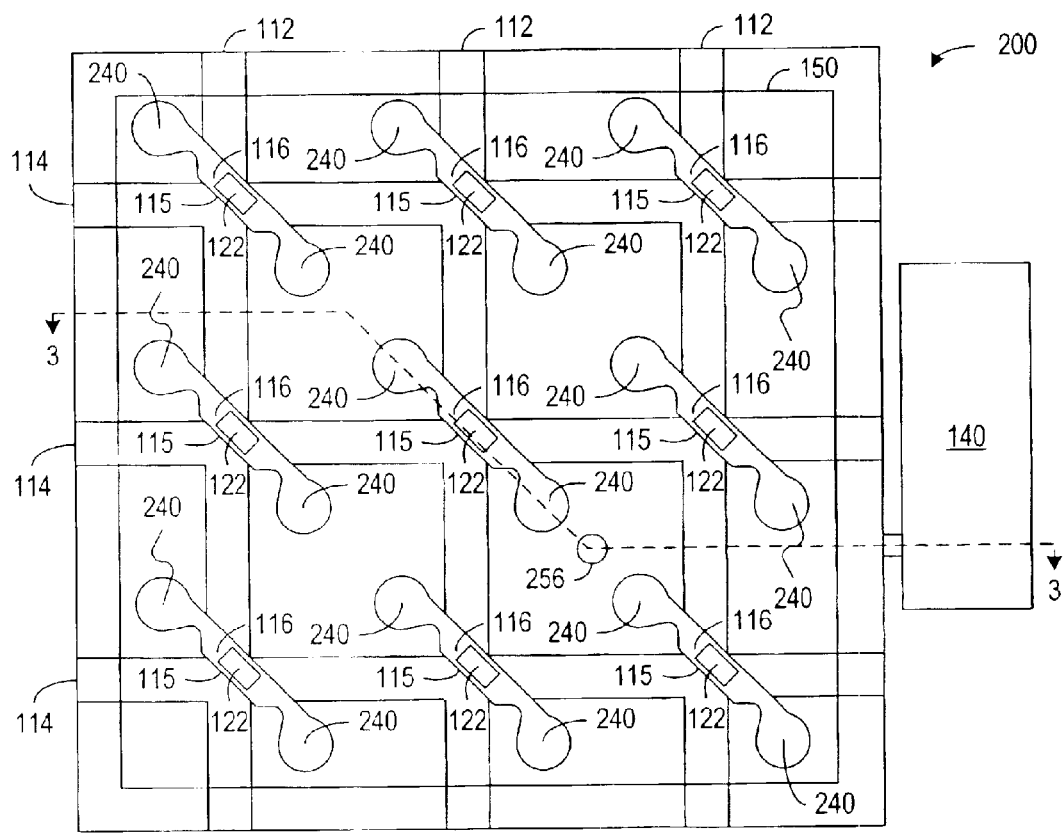
FIG. 2 shows a plan view of an optical switch in accordance with an embodiment of the invention using guard bubbles near each switching site to absorb shock waves and transient fluid flows during switching site activation or deactivation.

FIG. 2A shows a plan view of an optical switch 200 in accordance with an embodiment of the invention. Optical switch 200 includes a planar lightwave circuit 210, a semiconductor substrate 220, a base plate 130, and a reservoir 140. Planar lightwave circuit 210 is a plate of an optical material such as quartz containing crossing waveguide segments 112 and 114. Such waveguide segments can be formed using known techniques such as a photolithographic process that implants impurities in a quartz blank to change the refractive index of a quartz blank as required to create waveguides. The quartz blank can then be etched to create cavities 116 and 240 in planar lightwave circuit 210. Etching can also create a depression for a liquid layer 150 that is between planar lightwave circuit 210 and semiconductor substrate 220 in the assembled optical switch 200. In an exemplary embodiment of the invention, the depression and liquid layer 150 are about 5 $\mu$m thick and extend across an area including all of the switching sites in optical switch 200.

Semiconductor substrate 220 is a silicon die containing electronic circuitry including heating elements 122 and associated control circuits (not shown). Heating elements 122 reside in respective cavities 116 of the assembled optical switch 200. Selectively activating a heating element 122 vaporizes liquid and creates a bubble in the corresponding cavity 116. In one embodiment of the invention, guard cavities 240 can be formed in semiconductor substrate 220 instead of in planar lightwave circuit 210. Forming guard cavities 240 in semiconductor substrate 220 allows guard cavities 240 to overlap areas required for waveguide segments 112 and 114.

Base plate 130 acts as a heat sink for semiconductor substrate 220 but also includes an inlet 154 connected to reservoir 140. Inlet 156 and at least one hole 256 through semiconductor substrate 220 allow liquid 142 to flow between reservoir 140 and liquid layer 150 underlying cavities 116 and from liquid layer 150 into cavities 116 and 240.

Reservoir 140 is partially filled with liquid 142 and partially filled with a gas 144 that is mostly vapor from liquid 142. The pressure of gas 144 controls the fluid pressure of liquid 142 and therefore controls the difficulty of forming and maintaining bubbles in cavities 116 and 240. U.S. Pat. No. 6,188,815 issued Feb. 13, 2001 to Schiaffino et al., entitled "Optical Switching Device and Method Utilizing Fluid Pressure Control to Improve Switching Characteristics," describes how a pressure controlling mechanism in a reservoir such as reservoir 140 can elevate the fluid pressure of a liquid such as liquid 142. U.S. patent application Ser. No. 10/211,196, entitled "Operating an Optical Switch at a Negative Pressure Differential" describes operation of an optical switch at a fluid pressure that is less than the partial vapor pressure of the liquid.

Figure 3A:
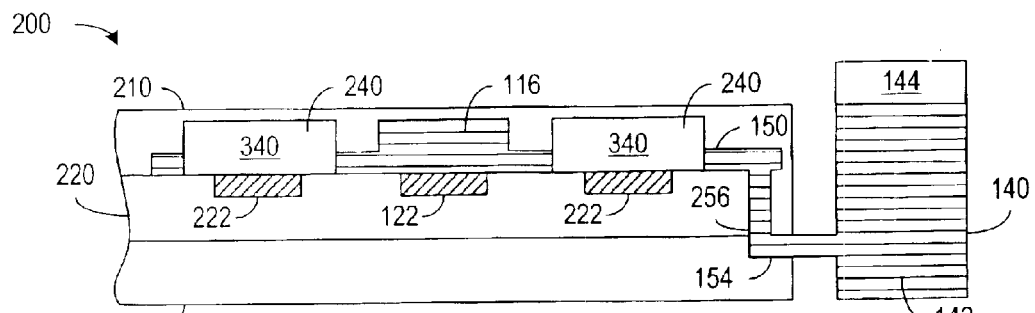
FIGS. 3A and 3B show cross-sectional views of the optical switch of FIG. 2 before and during activation of a switching site.

In optical switch 200, cavities 116, which correspond to the switching sites, have adjacent guard cavities 240 that contain guard bubbles 340 as shown in FIG. 3A. The size of cavities 240 and guard bubbles 340 and the operating temperature and fluid pressure of liquid 142 are preferably selected so that guard bubbles 340 in cavities 240 remain stable without continuous heating of guard cavities 240. Cavities 116 for the switching sites can be smaller so that the surface tension and the fluid pressure together are greater than the vapor pressure in a bubble 146 at the operating temperature and therefore causes the bubble 146 in a cavity 116 to collapse when the corresponding heating element 122 is shut off.

In one exemplary embodiment of the invention, guard cavities 240 have a diameter of about 70 $\mu$m and extend to a height of 45 μm above substrate 220. Connecting necks between each cavity 116 and the adjacent guard cavities 240 narrow (e.g., to about 9 μm wide) to confine guard bubbles 340 to guard cavities 240 but still provide low resistance for fluid flow between cavities 116 and 240. Cavities 116 are about 15 μm wide, 80 μm long, and extent to a height of 45 μm above substrate 220. Liquid 142 can be an organic solvent such as fluorobenzene that is at an operating temperature of about 18 to 20° C. and a differential pressure of about 1500 Pascals. Under these conditions bubbles 340 having a minimum dimension greater than about 35 μm are stable, but a bubble having a minimum dimension smaller than about 35 μm collapses unless heating maintains the bubble.

Figure 3B:
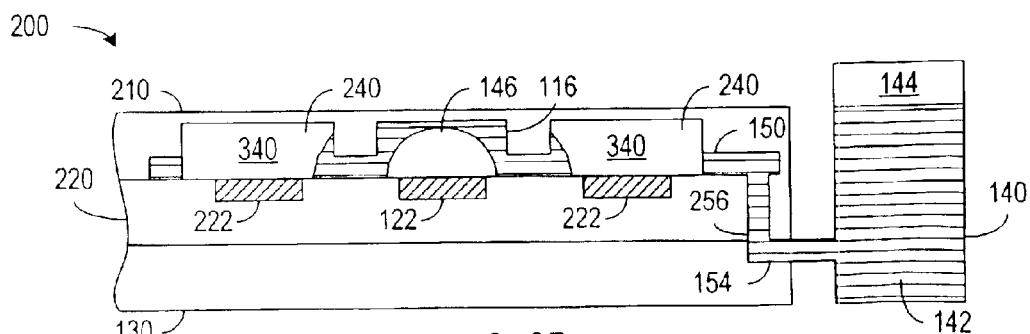

FIG. 3B shows a cross-sectional view of a switching site in optical switch 200 during creation of a bubble 146 in a cavity 116. Creating bubble 146 requires activation of heating element 122 with sufficient power to locally heat liquid 142 in the selected cavity 116 to a temperature above a level corresponding to the nucleation energy of liquid 142. This local heating of liquid 142 to well above the boiling point causes bubble 146 to quickly expand, and the expanding bubble 146 pushes liquid out of cavity 116. Viscosity and the restrictions on the flow of liquid 142 prevent the instantaneous flow of the displaced fluid to reservoir 140. Instead the fluid flows along the path of least resistance into guard cavities 240 compressing guard bubbles 340. Guard bubbles 340 subsequently expand to refill guard cavities 340 as displaced fluid from cavity 116 flows into reservoir 140.

In some prior optical switches, neighboring switching sites (e.g., other cavities 116 containing bubbles 146) are the nearest easily compressed volumes, and the transient fluid flows during bubble creations can interfere with the optical switch at those nearby switching sites. Guard bubbles 340 being closer and larger than switching bubbles 146 prevent any significant fluid flow into neighboring activated switching sites and thereby prevent hydrodynamic crosstalk and disruption of optical switching.

FIGS. 4A, 4B, 4C, and 4D illustrate the creation and use of guard bubbles 340 at a switching site 400 that includes a cavity 116 connected to guard cavities 240 by connecting necks 410. In switch 200, cavities 116 and 240 and connecting necks 410 are formed in planar lightwave circuit 210 and may all extend to the same height above substrate 220. Connecting necks 410 provide a relatively low resistance fluid path between cavity 116 and guard cavities 240 but are narrow enough to confine and separate bubbles in cavities 116 and 240. Liquid layer 150 extends under switching site 400 and provides a fluid path to other switching sites and to reservoir 140.

Figure 4A:
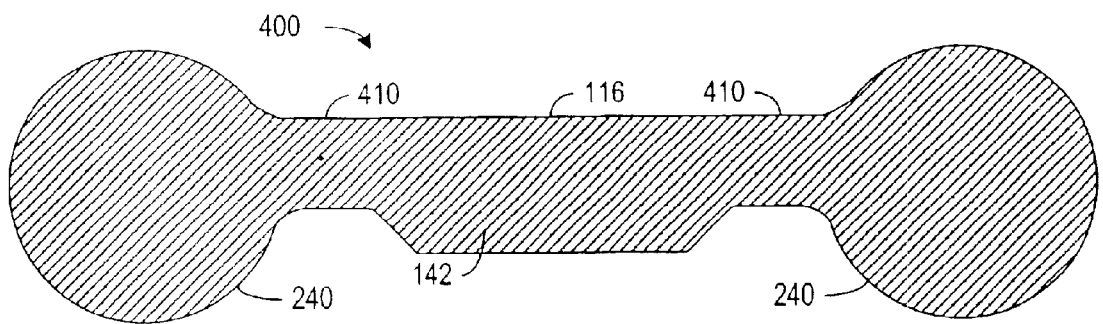
FIGS. 4A, 4B, 4C, and 4D respectively show plan views of a switching site before initialization, during initialization, in a non-reflective state, and in a reflective state in accordance with an embodiment of the invention.

FIG. 4A shows a configuration where switching site 400 is filled with liquid 142, which may be the configuration of switching site 400 before the optical switch powers up.

Figure 4B:
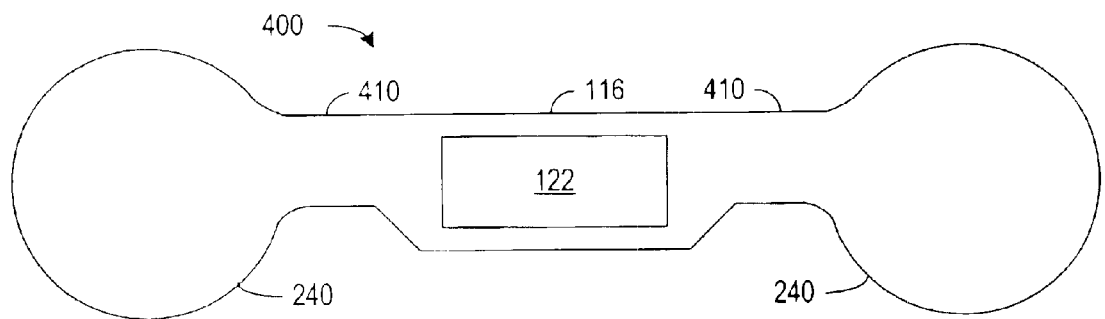

As part of a power-up process for the optical switch, heating element 122 operates at a high enough power level and for a sufficient time to create a bubble that extends to fill cavities 116, connecting necks 410, and guard cavities 240. Switching site 400 is then filled with a gas as shown in FIG. 4B. For creation of this bubble, the fluid pressure of liquid 142 can be lowered to pressure less than the normal operating fluid pressure. The fluid pressure reduction can be achieved, for example, by cooling reservoir 140. Alternatively, fluid pressure can be maintained at the normal operating level. Another method for facilitating creation of bubbles filling switching site 400 is a global heating of the optical switch.

Figure 4C:
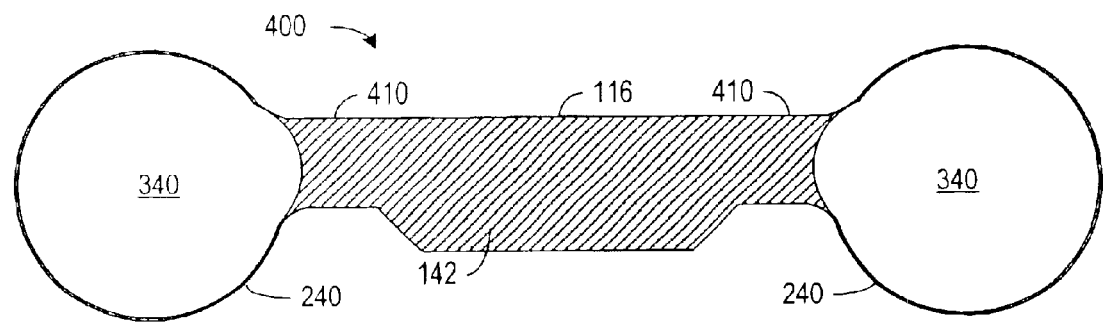

Shutting off heating element 122 and setting the temperature and fluid pressure of liquid 142 to their operating levels causes portions of the bubble in connecting necks 410 and cavity 116 to collapse as shown in FIG. 4C. In particular, at the operating temperature, the inward surface tension combined with the fluid pressure overcome the vapor pressure in connecting necks 410 and cavity 116 where the minimum dimensions are smaller. Guard bubbles 340 remain and are stable in guard cavities 240 because in the exemplary embodiment of the invention, the outward vapor pressure in a bubble having the size of a guard cavity 240 is greater than the inward force of fluid pressure and surface tension at the operating temperature.

FIG. 4C shows switching site 400 in its inactive or transparent state where cavity 116 is filled with liquid 142. The power-up process for the optical switch would generally initialize all switching sites to the transparent state with associated guard bubbles 340 as illustrated in FIG. 4C. The power-up process can initialize one or more of the switching sites at a time or initialize all of the switching sites in parallel depending on power requirements and capabilities of the circuitry in semiconductor substrate 220.

Figure 4D:
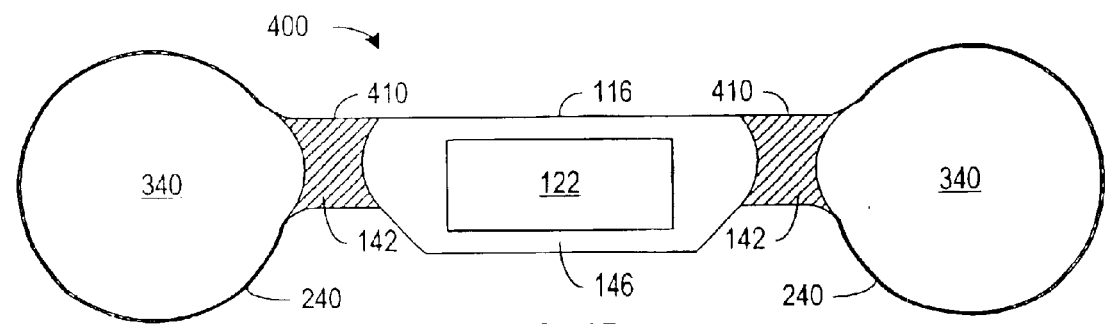

FIG. 4D shows switching site 400 in its active or reflective state where cavity 116 contains a bubble 146. Starting with the gas-filled state of FIG. 4B, switching site 400 could be initialized to the reflective state by reducing the power level of heating element 122 to a desired non-zero level. The gas cools to a point where portions of the bubble in connecting necks 410 collapse, but a bubble 146 in cavity 116 remains. Alternatively, to activate switching site 400 from the deactivated state of FIG. 4C, heating element 122 locally heats liquid in cavity 116 to the temperature corresponding to the nucleation energy to start formation of bubble 146. The power level of the heating element can then be decreased to a level that maintains bubble 146 in cavity 116.

FIGS. 4A, 4B, 4C, and 4D illustrate an exemplary initialization process that creates guard bubbles 340 in guard cavities 240 using the heating element 122 in the switching cavity 116. Alternatively, separate heating elements 222 (FIG. 3A) can be included in guard cavities 240 for creation of guard bubbles 340 with or without filling cavity 116 or entire switching site 400 with a bubble. Further, such additional heating elements could be used to maintain guard bubbles 340, for example, if guard bubbles 340 are not sufficiently stable at the operating fluid pressure and temperature of the optical switch. However, constant active heating to maintain guard bubbles 340 would undesirably increase power consumption and heat generation in the optical switch.

Figure 5:
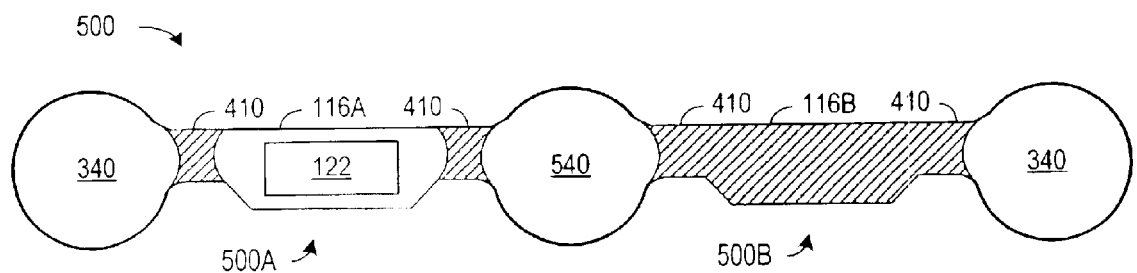
FIG. 5 shows a plan view of multiple switching sites that share a guard bubble in accordance of an embodiment of the invention.

FIG. 5 illustrates a structure 500 in accordance with an embodiment of the invention in which multiple switching sites 500A and 500B share a guard bubble 540. Structure 500 may be employed to reduce the area required for guard bubbles in an optical switch having a high density of switching sites and guard cavities formed in planar lightwave circuit 210.

Structure 500 is an illustrative example of an embodiment of the invention having two switching sites 500 aligned along a line, but alternatively, any number of switching sites arranged in any desired configuration can share one or more guard bubbles. The location of guard cavities 240 and guard bubbles 340 will generally depend upon the locations of switching cavities 116 and waveguides 112 and 114 in an optical switch and whether guard cavities are formed in planar lightwave circuit 210 or semiconductor substrate 220.

Guard bubbles 340 and 540 in configuration 500 can be created and maintained using power-up processes that are substantially the same as those described above with reference to FIGS. 4A, 4B, 4C, and 4D. In an exemplary embodiment, heating elements 122 in all connected switching sites 500A and 500B are activated to fill structure 500 with a gas bubble, and then the power to heating elements 122 is reduced or turned off to collapse the bubble in connecting necks 410 and in selected cavities 116.

Although the invention has been described with reference to particular embodiments, the description is only an example of the invention's application and should not be taken as a limitation. For example, although the above embodiments generally employ connecting necks to channel fluid flow from switch cavities to guard cavities, the connecting necks could be omitted when another feature such as the underlying liquid layer provides fluid flow between the switching cavities and the guard cavities. Various other adaptations nations of features of the embodiments disclosed are within the scope of the as defined by the following claims.

What is claimed is:

1. An optical switch comprising:
   an optical structure containing:
      a set of first optical paths;
      a set of second optical paths that cross the first optical paths; and
      a plurality of switching cavities at intersections of the first optical paths and the second optical paths;
   a liquid in fluid communication with the switching cavities, wherein each switching cavity has a first state in which the switching cavity is filled with the liquid and a second state in which the switching cavity contains a bubble; and
   a set of guard chambers that are in fluid communication with the switching cavities and the liquid, each guard chamber containing a bubble.

2. The optical switch of claim 1, wherein each guard chamber is a cavity that is in the optical structure and away from the first and second optical paths.

3. The optical switch of claim 2, further comprising a plurality of connecting necks in the optical structure, each connecting neck providing a fluid path between a corresponding one of the switching cavities and a corresponding one of the guard chambers.

4. The optical switch of claim 3, wherein the connecting necks connect one of the switching cavities to two or more of the guard chambers.

5. The optical switch of claim 3, wherein the connecting necks connect one of the guard chambers to two or more of the switching cavities.

6. The optical switch of claim 1, wherein a pressure difference between a fluid pressure of the liquid and a vapor pressure of the liquid is such that the bubble in the guard chamber is stable at an operating temperature of the liquid.

7. The optical switch of claim 6, wherein the pressure difference is such that each switching cavity requires local heating to maintain the switching cavity in the second state.

8. The optical switch of claim 1, further comprising heating elements that are respectively in the switching cavities.

9. The optical switch of claim 8, further comprises heating elements that are respectively in the guard chambers.

10. A method for operating an optical switch, comprising:
    maintaining bubbles in a plurality of guard chambers that are in fluid communications with a liquid and switching cavities of the optical switch; and
    locally heating the liquid in a selected one of the switching cavities to create a bubble in the selected switching cavity, wherein liquid that is displaced by bubble creation in the selected cavity flows into one or more of the guard chambers.

11. The method of claim 10, wherein maintaining the bubbles in the guard chambers comprises maintaining the liquid at a fluid pressure and an operating temperature such that bubbles filling the guard chambers are stable without heating the guard chambers.

12. The method of claim 11, wherein the fluid pressure, the operating temperature, and dimensions of the switching cavities are such that the bubble in the selected switching cavity collapses when local heating stops.

13. The method of claim 10, further comprising creating the bubbles in the guard chambers by heating the liquid in the switching cavities to create bubbles that expand from the switching cavities into the guard chambers.

14. The method of claim 13, wherein creating the bubbles in the guard chambers further comprises stopping the heating of the switching cavities so that portions of the bubbles in the switching cavities collapse and the bubbles in the guard chambers remain.

* * * * *